UNITED STATES PATENT OFFICE.

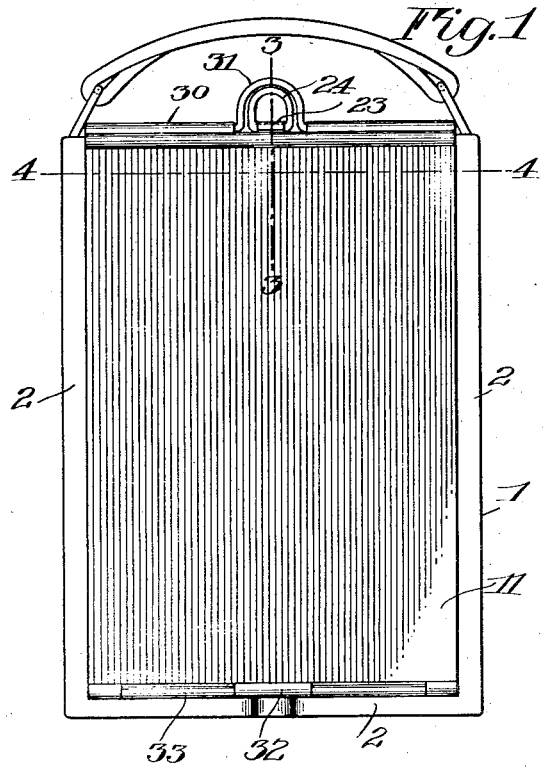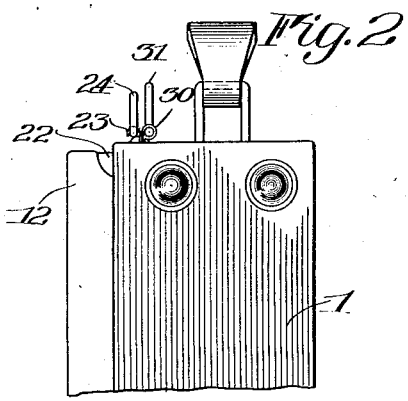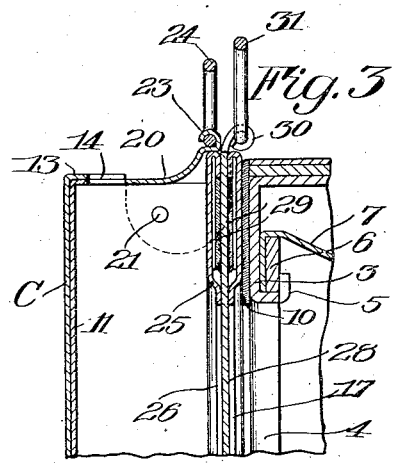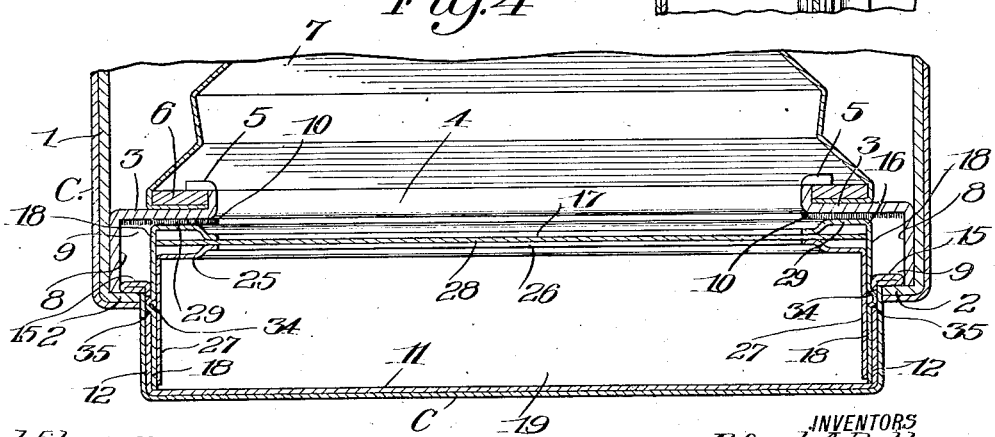

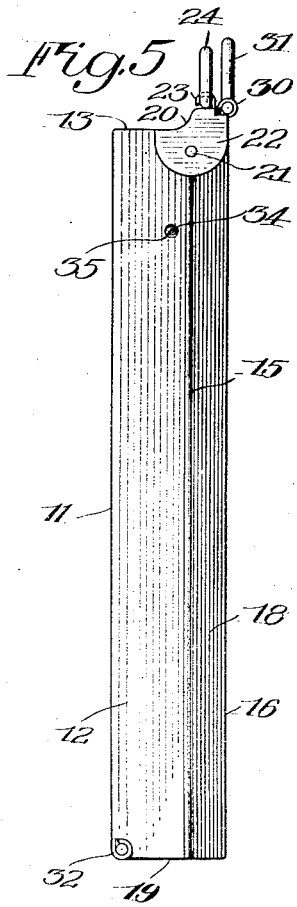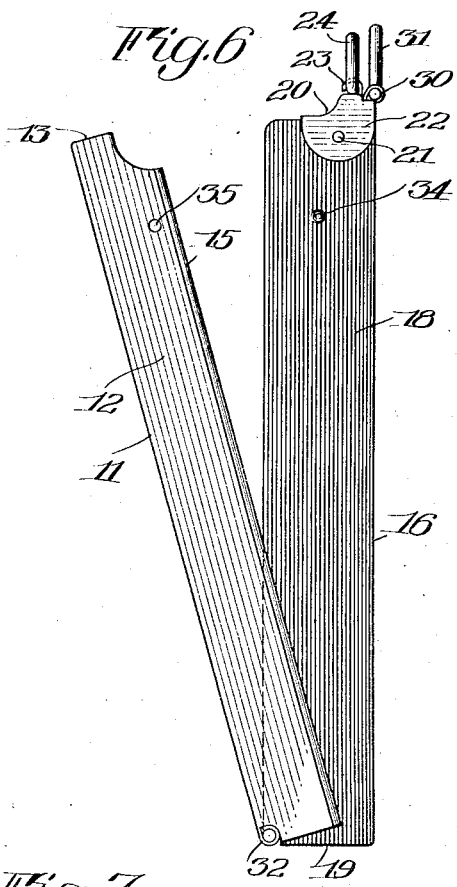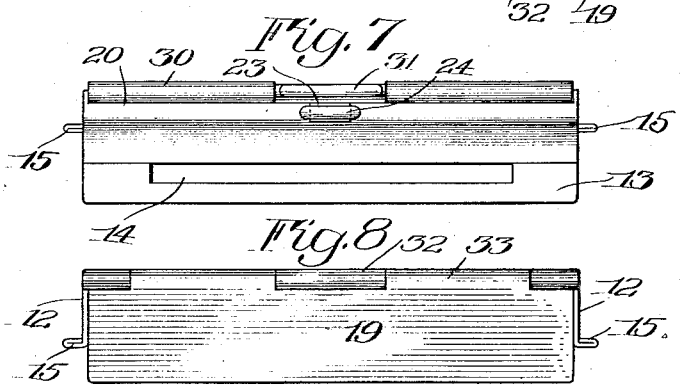

ALFRED A. RUTTAN AND CHARLES E. HUTCHINGS, OF ROCHESTER, NEW YORK, ASSIGNORS TO EASTMAN KODAK COMPANY, OF ROCHESTER, NEW YORK, A CORPORATION OF NEW YORK.

FILM-PACK ADAPTER FOR CAMERAS.

1,266,323.  Specification of Letters Patent.  Patented May 14, 1918.

Application filed November 24, 1916. Serial No. 133,114.

*To all whom it may concern:*

Be it known that we, ALFRED A. RUTTAN and CHARLES E. HUTCHINGS, both of Rochester, in the county of Monroe and State of New York, have invented certain new and useful Improvements in Film-Pack Adapters for Cameras; and we do hereby declare the following to be a full, clear, and exact description of the same, reference being had to the accompanying drawings, forming a part of this specification, and to the reference-numerals marked thereon.

Our present invention relates to photography, and more particularly to film pack adapters for cameras through the use of which the well known film pack embodying separate cut sheets of film manipulated by tabs and inclosed in a paper package may be used in a camera otherwise adapted only for glass plates, and it has for its object to provide a simple, cheap and convenient construction for such a device that will offer certain conveniences and advantages both in loading the pack into the adapter and in applying the adapter to the camera. The improvements are also directed in part toward so equipping the adapter that a camera body of relatively small proportions can accommodate it, and to these and other ends the invention consists in certain improvements and combinations of parts, all as will be hereinafter more fully described, the novel features being pointed out in the claims at the end of the specification.

In the drawings:

Figure 1 is a rear elevation of a camera fitted with an adapter constructed in accordance with and illustrating one embodiment of our invention;

Fig. 2 is a side elevation of the upper portion only of the camera and adapter;

Fig. 3 is a fragmentary sectional view enlarged, taken substantially on the line 3—3 of Fig. 1;

Fig. 4 is an enlarged horizontal section taken substantially on the line 4—4 of Fig. 1;

Fig. 5 is a side view, enlarged, of the adapter alone in closed position;

Fig. 6 is a similar view of the adapter open;

Fig. 7 is a top plan view, and

Fig. 8 is a bottom plan view.

Similar reference numerals in the several figures indicate the same parts.

Referring first to the Figs. 1 to 4, showing portions of the camera body and the adapter in coöperation with each other, the camera body may comprise a sheet metal shell 1, the rear edges of which are turned inwardly to form flanges 2 at the two sides and at the bottom. In all the figures C merely indicates the leather or other covering material that gives finish to the exterior parts. In front of the flanges 2 is the usual frame 3 just forward of the focal plane of the camera, and which provides the usual exposure opening 4. In the present instance this frame is of sheet metal, and is further flanged forwardly at 5 at the margins of the exposure opening 4 to confine a smaller frame 6 that is the medium through which the rear end of the usual bellows 7 leading to the lens is secured in place. The frame is further flanged rearwardly at 8 to lie against the sides of the body 1 and to abut against the flanges 2 at the rear so that the latter, in conjunction with the frame, form a pocket 9 at the rear of the camera and opening at the top thereof into which the removable adapter about to be described may be slidably inserted or withdrawn. The rear faces of the frame 3 are preferably covered with plush or other light sealing material 10 to make light tight contact with the adapter.

The adapter itself, in the practice of our invention, comprises a two-part shell, parts of which may be separated as in Fig. 6. The rear part 11 in the present instance consists of an imperforate plate having forwardly extending flanges 12 at the sides, and a short flange 13 at the top having an opening 14 therein. This opening 14 is the usual opening through which the tabs of the well known film pack project for manipulation. The side flanges 12 are further flanged laterally and outwardly, as at 15. The front part 16 of the adapter consists of a frame having an exposure opening 17 therein and provided with rearwardly extending flanges 18 at the sides and 19 at the bottom. In the present instance it has no integral flange at the top but a separate plate 20 in the nature of a flange extends rearwardly from its upper edge and is secured by rivets 21 on ears 22 at the side so that this plate, acting in conjunction with the flange 13 on the rear portion of the shell, closes the top of the latter, except for the restricted opening 14, of which it forms one side. The plate 20 may further be rolled at its front edge, as indicated at 23, as a securing means for a small bail 24 that is utilized to withdraw the adapter from the pocket 9 in the camera. A second frame 25 substantially coincident with the frame 16 has an exposure opening 26 registering with the exposure opening 17, and has rearward flanges 27 disposed against and secured to the flanges 18 of the frame 16, thus strengthening the frame throughout its extent. The margins of the openings 17 and 26 are offset toward each other, as shown in Fig. 4, and are separated just sufficiently to provide tight guides for a sliding shutter 28 of the usual type that passes through an opening between the frames at the top, as shown in Fig. 3, where it is contacted on both sides by suitable light seals 29 suitably secured in the frames. This shutter slide may also have a rolled edge 30 forming a pivotal bearing for a bail 31 to be grasped by the fingers during the manipulation of the slide. This bail is preferably wider than and arranged opposite to the bail 24 so that they will not interfere with each other.

The two parts 11 and 16 of the shell are preferably hinged together at the bottom, and in the present instance the hinge line is in the plane of the body of the back member 11, knuckles 32 being formed on the latter alternating with knuckles 33 on the bottom flange 19 of the forward member 16. The flanges 18 and 12 on the respective members, therefore, overlap or telescope into each other so that the lateral flanges 15 on the rear member 11 are brought quite far forwardly. The two parts of the shell are held together in a temporary manner by nicks 34 struck up from the flanges 18 coöperating with recessed or apertured portions 35 in the flanges 12.

In loading the adapter with the film pack the adapter is opened, as in Fig. 6, and the film pack placed therein to lie between the flanges 18, 19 and 20 of the forward half 16 of the shell, and the remaining part 11 is then closed down in the nature of a cover. The adapter is then slid into the pocket 9 of the camera body with the flanges 15 forwardly of and interlocking with the flanges 2 of the camera body, as shown clearly in Fig. 4. This interlocking of the flanges 15 and 2 not only holds the adapter securely in the camera but holds the two parts of the adapter shell together in the most secure and efficient manner, and no separate locks are required. The whole adapter is not accommodated in the pocket 9 by reason of the forward arrangement of the flanges 15, and hence the pocket can be made very narrow, materially reducing the bulk of the camera.

We claim as our invention:

1. In a film pack adapter for cameras, the combination with a camera body provided with inturned spaced flanges at its rear forming a pocket, of an adapter carried in the pocket to be slidably withdrawn therefrom and comprising a two-part sheet metal shell, the rearward portion of which is composed of a plate having forwardly and thence outwardly turned flanges interlocking with those on the camera body.

2. In a film pack adapter for cameras, the combination with a camera body provided with inturned spaced flanges at its rear forming a pocket, of an adapter carried in the pocket to be slidably withdrawn therefrom and comprising two separable sheet metal parts, the rearmost of which parts is provided with outwardly turned flanges interlocking with those on the camera body.

3. In a film pack adapter for cameras, the combination with a camera body provided with inturned spaced flanges at its rear forming a pocket, of an adapter carried in the pocket to be slidably withdrawn therefrom and comprising two parts hinged together to form a containing shell for the film pack, the rearmost of said parts being provided with outwardly turned flanges interlocking with those on the camera body to hold the shell together and the adapter in place upon the camera body.

ALFRED A. RUTTAN.
CHARLES E. HUTCHINGS.

Witnesses:
LINDA SCHURING,
HELEN M. FRASER.